UNITED STATES PATENT OFFICE.

CLYDE W. ADAMS, OF NEW YORK, N. Y., ASSIGNOR, BY MESNE ASSIGNMENTS, TO ADAMS GREASE & OIL COMPANY, OF NEW YORK, N. Y., A CORPORATION OF NEW YORK.

LUBRICATING COMPOUND.

1,066,971. Specification of Letters Patent. Patented July 8, 1913.

No Drawing. Application filed July 11, 1910. Serial No. 571,303.

*To all whom it may concern:*

Be it known that I, CLYDE W. ADAMS, a citizen of the United States, and a resident of New York city, in the county of New York and State of New York, have invented a certain new and useful Composition of Matter to be Used as a Lubricating Compound, of which the following is a specification.

This invention relates to a composition of matter to be used as a lubricating compound for general purposes. I have found in practice that it is particularly efficient in transmission gears, differential gears, clutches, timing gears, and as an axle grease; and, in fact, wherever it is desired to reduce the friction by means of a lubricating compound. It is also particularly advantageous in lubricating the gears of power driven vehicles such as automobiles, but it is to be distinctly understood that my invention is not confined to this or any other particular use for it is adapted for general application.

My lubricating compound consists essentially of comminuted mica, a heavy lubricating oil and a grease. I also preferably, though not necessarily, add a minimal amount of sulfur which renders the composition more advantageous in use. What I consider to be the best proportion of these different ingredients, but to which my invention is not to be limited, is the following: 44¾% mica; 50% heavy lubricating oil; 5% grease; and, if sulfur is used, I employ approximately a quarter of one per cent. I have found that for the heavy lubricating oil a suitable cylinder oil may be used which is known in the trade as "green oil." For the grease I preferably, though not necessarily, use some form of commercial compound lubricating grease, such for example as known to the trade as "No. 3½ regular grease." Therefore my lubricating compound is preferably composed of the following ingredients and substantially, though not necessarily, in the proportions given,— 44¾% fine comminuted mica (about 200 mesh); 50% heavy lubricating oil, such as cylinder oil (a grade of oil known in the market as green oil); 5% compound lubricating grease preferably what is known as No. 3½ regular grease; and ¼ of 1% of pulverized sulfur. These bodies mixed in about the proportions given produce a lubricant of what may be termed a "short" or "tender" consistency; a consistent or non-fluid lubricant which is more wax-like than greasy, having an almost crumbly or friable texture in mass. Its physical character somewhat resembles that of a semi-solid soap, being considerably softer than ordinary hard soap but not being fluid at ordinary temperatures, and not being as viscous as an oil or simple grease. In effect, the lubricant is a composition of mica carrying a heavy, viscous lubricating oil which is given a thicker consistence by an admixture of the "grease." The oil is held by the mica rather than the mica held by the oil. The mica employed is advantageously excessively fine: (as stated, about 200-mesh) as this increases its carrying power. And with the proportions of oil and mica used, the oil is uniformly distributed throughout the body of mica and held there by surface tension. Fine powdered mica will take up about half its weight of even a thinly fluid oil to make a dry composition. Of a thicker oil it will take up somewhat more. The object of the present invention is to make a composition carrying a thick lubricating fluid which is somewhat, but not greatly, in excess of the amount which will be taken up by the mica, thereby giving a lubricant of the physical character described. These are the ingredients and substantially the proportions which I preferably use, though it is to be understood that the proportions may be varied, mica of an entirely different mesh may be used, a different kind of heavy lubricating oil may be employed, and that various kinds of grease may be used I have found in practice that my lubricating compound tends to preserve the transmission gears, increase their life and render them noiseless in operation, all of which is of material advantage wherever the lubricating compound is employed and particularly if it is used on the gears of a power driven vehicle such an automobile.

When I refer in the specification to No. 3½ regular grease I refer to a well known article of trade, an analysis of which shows it to be made of the following ingredients in substantially the proportions given, to wit,—

Lubricating oil (mineral, specific gravity 0.896) _____ 74.76%
Calcium soap (derived from lard) _ 18.02%
Lard oil _____ 5.80%
Oil of mirbane _____ 1.25%

The "green oil" herein referred to is also a well known article of trade and is a natural mineral oil refined. A test shows the following characteristics;—

Gravity _____ 29
Flash test _____ 470
Fire test _____ 525
Cold test _____ 35
Viscosity (at 212 F.) _____ 90

While I preferably use this No. 3½ regular grease and the green oil referred to and which are usually formed of the ingredients and possessed of the characteristics here set forth, it is to be distinctly understood that these different ingredients and characteristics may vary somewhat without departing from my invention.

Having thus described this invention in connection with the different embodiments thereof to the details of which I do not desire to be limited what is claimed as new and what it is desired to secure by Letters Patent is set forth in the appended claims:

1. A lubricating compound including the following ingredients in substantially the per cents. given; 44¾ per cent. mica, 50 per cent. heavy lubricating oil and 5 per cent. grease.

2. A lubricating compound including the following ingredients in substantially the per cents. given; 44¾ per cent. mica, 50 per cent. heavy lubricating oil, 5 per cent. grease and ¼ of one per cent. finely divided sulfur.

3. A lubricating composition consisting of about one-half heavy lubricating oil, nearly the same amount of comminuted mica and a residue consisting mainly of a grease of the character specified.

4. A lubricating composition consisting of about one-half heavy lubricating oil, nearly the same amount of comminuted mica and a residue composed of a grease of the character specified and of sulfur.

5. A lubricating composition consisting of finely ground comminuted mica carrying about an equal amount of a heavy, viscous, lubricating, oleaginous body, said oleaginous body consisting for the main part of a heavy, lubricating oil with a small amount of consistence-giving grease.

6. A lubricating composition consisting of a finely ground comminuted mica carrying about an equal amount of a heavy, viscous, lubricating, oleaginous body, said oleaginous body consisting of a heavy, lubricating oil with a small amount of consistence-giving grease and sulfur.

CLYDE W. ADAMS.

Witnesses:
 ALFRED E. POOLE,
 AVERY HICKEY.